United States Patent
Matsumoto et al.

(10) Patent No.: US 11,532,329 B1
(45) Date of Patent: Dec. 20, 2022

(54) HEAT-ASSISTED MAGNETIC RECORDING (HAMR) HEAD WITH MAIN POLE HAVING RECESS FOR PLASMONIC MATERIAL

(71) Applicant: Western Digital Technologies, Inc., San Jose, CA (US)

(72) Inventors: Takuya Matsumoto, San Jose, CA (US); Barry Cushing Stipe, San Jose, CA (US); Muhammad Asif Bashir, San Jose, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 17/588,473

(22) Filed: Jan. 31, 2022

(51) Int. Cl.
| | | |
|---|---|---|
| *G11B 5/60* | (2006.01) | |
| *G11B 5/48* | (2006.01) | |
| *G11B 13/08* | (2006.01) | |
| *G11B 5/187* | (2006.01) | |
| *G11B 5/00* | (2006.01) | |

(52) U.S. Cl.
CPC ............ *G11B 13/08* (2013.01); *G11B 5/1875* (2013.01); *G11B 2005/0021* (2013.01)

(58) Field of Classification Search
CPC ..... G11B 5/6088; G11B 5/314; G11B 5/3106; G11B 5/3133; G11B 2005/0021; G11B 5/59633; G11B 5/3912; G11B 5/4866; G11B 13/08; G11B 11/105
USPC .................................................... 360/59, 328
See application file for complete search history.

(56) References Cited

U.S. PATENT DOCUMENTS

| | | |
|---|---|---|
| 8,705,327 B2 | 4/2014 | Matsumoto |
| 10,121,496 B1 | 11/2018 | Peng et al. |
| 10,249,333 B2 | 4/2019 | Maletzky et al. |
| 10,403,315 B2 * | 9/2019 | Matsumoto .......... G11B 5/3106 |
| 10,482,907 B1 | 11/2019 | Mani Biswas et al. |
| 2015/0154989 A1 | 6/2015 | Zhao et al. |
| 2015/0287425 A1 | 10/2015 | Guler et al. |
| 2016/0284372 A1 | 9/2016 | Duda et al. |
| 2019/0378539 A1 | 12/2019 | Matsumoto et al. |
| 2021/0027808 A1 | 1/2021 | Matsumoto et al. |

OTHER PUBLICATIONS

International Search Report and Written Opinion for International Application No. PCT/US2022/030415 dated Oct. 21, 2022.

* cited by examiner

*Primary Examiner* — Nabil Z Hindi
(74) *Attorney, Agent, or Firm* — Patterson & Sheridan, LLP; Steven H. VerSteeg

(57) ABSTRACT

A heat-assisted magnetic recording (HAMR) head has a slider with a gas-bearing-surface (GBS). The slider supports a near-field transducer (NFT) and a main magnetic pole that has a step or recess in the NFT-facing surface near the GBS that contains plasmonic material. A thermal shunt is located between the NFT and the main pole to allow heat to be transferred away from the optical spot generated by the NFT. The NFT-facing surface of the main pole that is recessed from the step away from the GBS is in contact with the thermal shunt, and the thermal shunt is in contact with the plasmonic material in the step in the back region recessed from the GBS, so there is no increase in the spacing between the NFT and a large portion of the main pole.

24 Claims, 12 Drawing Sheets

Cross Section B-B

HEAT-ASSISTED MAGNETIC RECORDING (HAMR) HEAD WITH MAIN POLE HAVING RECESS FOR PLASMONIC MATERIAL

TECHNICAL FIELD

This invention relates generally to a heat-assisted magnetic recording (HAMR) disk drive, in which data are written while the magnetic recording layer on the disk is at an elevated temperature, and more specifically to an improved HAMR head.

BACKGROUND

In conventional magnetic recording, thermal instabilities of the stored magnetization in the recording media can cause loss of recorded data. To avoid this, media with high magneto-crystalline anisotropy ($K_u$) are required. However, increasing $K_u$ also increases the coercivity of the media, which can exceed the write field capability of the write head. Since it is known that the coercivity of the magnetic material of the recording layer is temperature dependent, one proposed solution to the thermal stability problem is heat-assisted magnetic recording (HAMR), wherein high-$K_u$ magnetic recording material is heated locally during writing by the main magnetic pole to lower the coercivity enough for writing to occur, but where the coercivity/anisotropy is high enough for thermal stability of the recorded bits at the ambient temperature of the disk drive (i.e., the normal operating or "room" temperature of approximately 15-30° C.). In some proposed HAMR systems, the magnetic recording material is heated to near or above its Curie temperature. The recorded data is then read back at ambient temperature by a conventional magnetoresistive read head. HAMR disk drives have been proposed for both conventional continuous media, wherein the magnetic recording material is a continuous layer on the disk, and for bit-patterned media (BPM), wherein the magnetic recording material is patterned into discrete data islands or "bits".

One type of proposed HAMR disk drive uses a laser source and an optical waveguide coupled to a near-field transducer (NFT) for heating the recording layer on the disk. A "near-field" transducer refers to "near-field optics", wherein the passage of light is through an element with sub-wavelength features and the light is coupled to a second element, such as a substrate like a magnetic recording layer, located a sub-wavelength distance from the first element to generate a heated optical spot on the recording layer. The NFT is typically located at the gas-bearing surface (GBS) of the gas-bearing slider that also supports the read head and write head and rides or "flies" above the disk surface. The write head includes a main pole with a tip at the GBS near the NFT that directs a magnetic field to the recording layer while the NFT heats the recording layer. A thermal shunt of high thermal conductivity material is located between the NFT and the main pole to allow heat to be transferred away from the optical spot.

A NFT with a generally triangular or trapezoidal shaped output end is described in U.S. Pat. No. 8,705,327 B2 assigned to the same assignee as this application. In this NFT an evanescent wave generated at a surface of the waveguide couples to surface plasmons excited on the surface of the NFT and a strong optical near-field is generated at the apex of the output end.

SUMMARY

It is important that the HAMR disk has a high thermal gradient in the recording layer, meaning there is a sharp drop in temperature at the edges of the bits being recorded. It has been proposed to add a full-film layer of plasmonic material under the main pole and facing the NFT to increase the thermal gradient. However, this plasmonic layer increases the gap between the NFT and the main pole, which reduces the magnetic field intensity at the recording layer.

In embodiments of this invention, instead of a full film under the main pole, the main pole has a step or recess in the NFT-facing surface near the GBS that contains plasmonic material. The plasmonic recess is aligned with the NFT in the along-the-track direction. The main portion of the main pole behind the plasmonic recess is in contact with the thermal shunt which does not reduce the gap between the NFT and the main pole. The plasmonic recess in the main pole extends from the GBS beyond the front of the thermal shunt so that there is a portion of metallic shunt material at the front of the thermal shunt and in contact with the plasmonic material in the main pole recess.

For a fuller understanding of the nature and advantages of the present invention, reference should be made to the following detailed description taken together with the accompanying figures.

DETAILED DESCRIPTION

Figure 1:
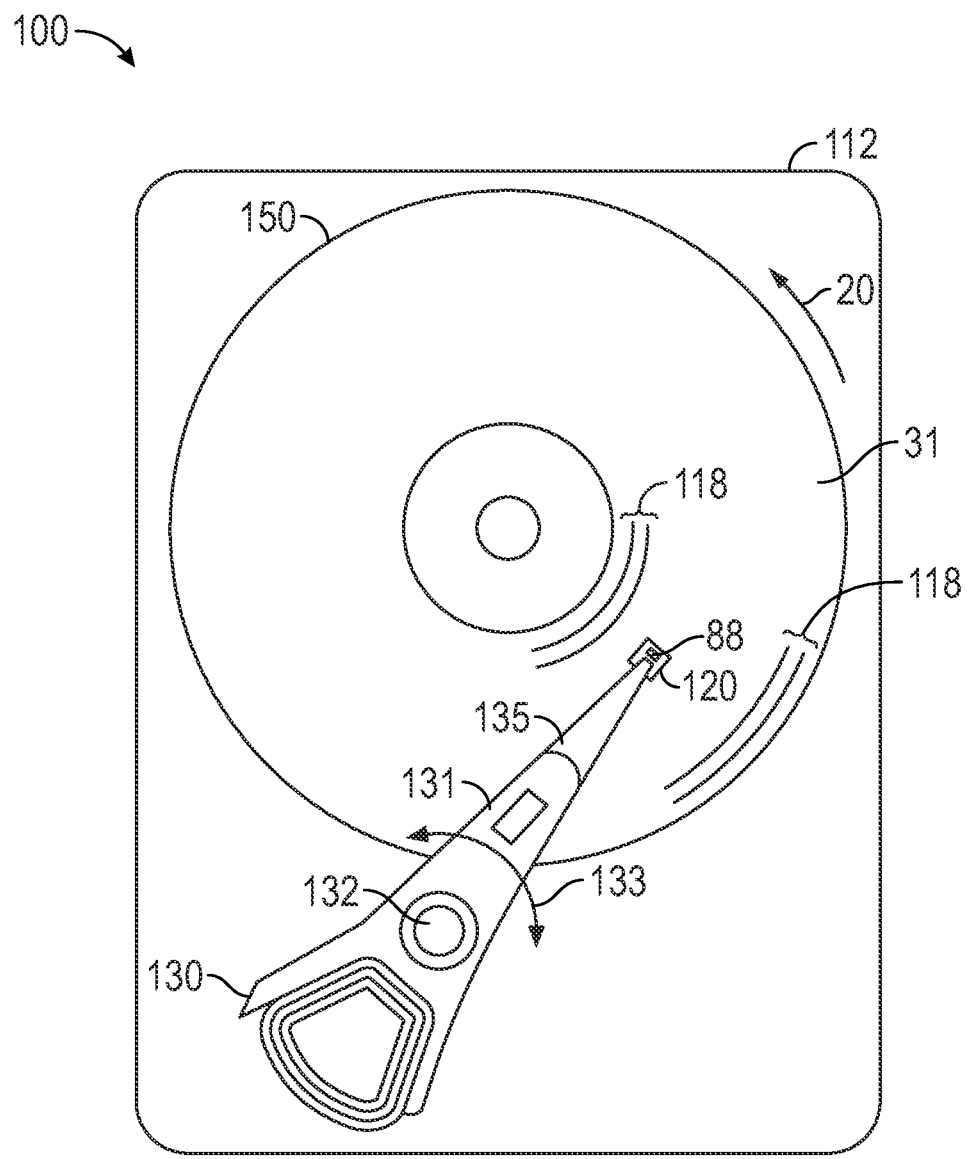
FIG. 1 is a top view of a heat-assisted magnetic recording (HAMR) disk drive according to an embodiment of the invention.

FIG. 1 is a top view of a heat-assisted recording (HAMR) disk drive 100 according to an embodiment of the invention.

In FIG. 1, the HAMR disk drive 100 is depicted with a disk 150 with magnetic recording layer 31 of conventional continuous magnetic recording material arranged in radially-spaced circular tracks 118. Only a few representative tracks 118 near the inner and outer diameters of disk 150 are shown. However, instead of a conventional continuous magnetic recording layer, the recording layer may be a bit-patterned-media (BPM) layer with discrete data islands.

The drive 100 has a housing or base 112 that supports an actuator 130 and a drive motor for rotating the magnetic recording disk 150. The actuator 130 may be a voice coil motor (VCM) rotary actuator that has a rigid arm 131 and rotates about pivot 132 as shown by arrow 133. A head-suspension assembly includes a suspension 135 that has one end attached to the end of actuator arm 131 and a head carrier, such as a gas-bearing slider 120, attached to the other end of suspension 135. The suspension 135 permits the slider 120 to be maintained very close to the surface of disk 150 and enables it to "pitch" and "roll" on the bearing of gas (typically air or helium) generated by the disk 150 as it rotates in the direction of arrow 20. The slider 120 supports the HAMR head (not shown), which includes a magnetoresistive read head, an inductive write head, the near-field transducer (NFT) and optical waveguide. A semiconductor laser 88 with a wavelength of 780 to 980 nm may used as the HAMR light source and is depicted as being supported on the top of slider 120. Alternatively the laser may be located on suspension 135 and coupled to slider 120 by an optical channel. As the disk 150 rotates in the direction of arrow 20, the movement of actuator 130 allows the HAMR head on the slider 120 to access different data tracks 118 on disk 150. The slider 120 is typically formed of a composite material, such as a composite of alumina/titanium-carbide ($Al_2O_3$/TiC). Only one disk surface with associated slider and read/write head is shown in FIG. 1, but there are typically multiple disks stacked on a hub that is rotated by a spindle motor, with a separate slider and HAMR head associated with each surface of each disk.

Figure 2:
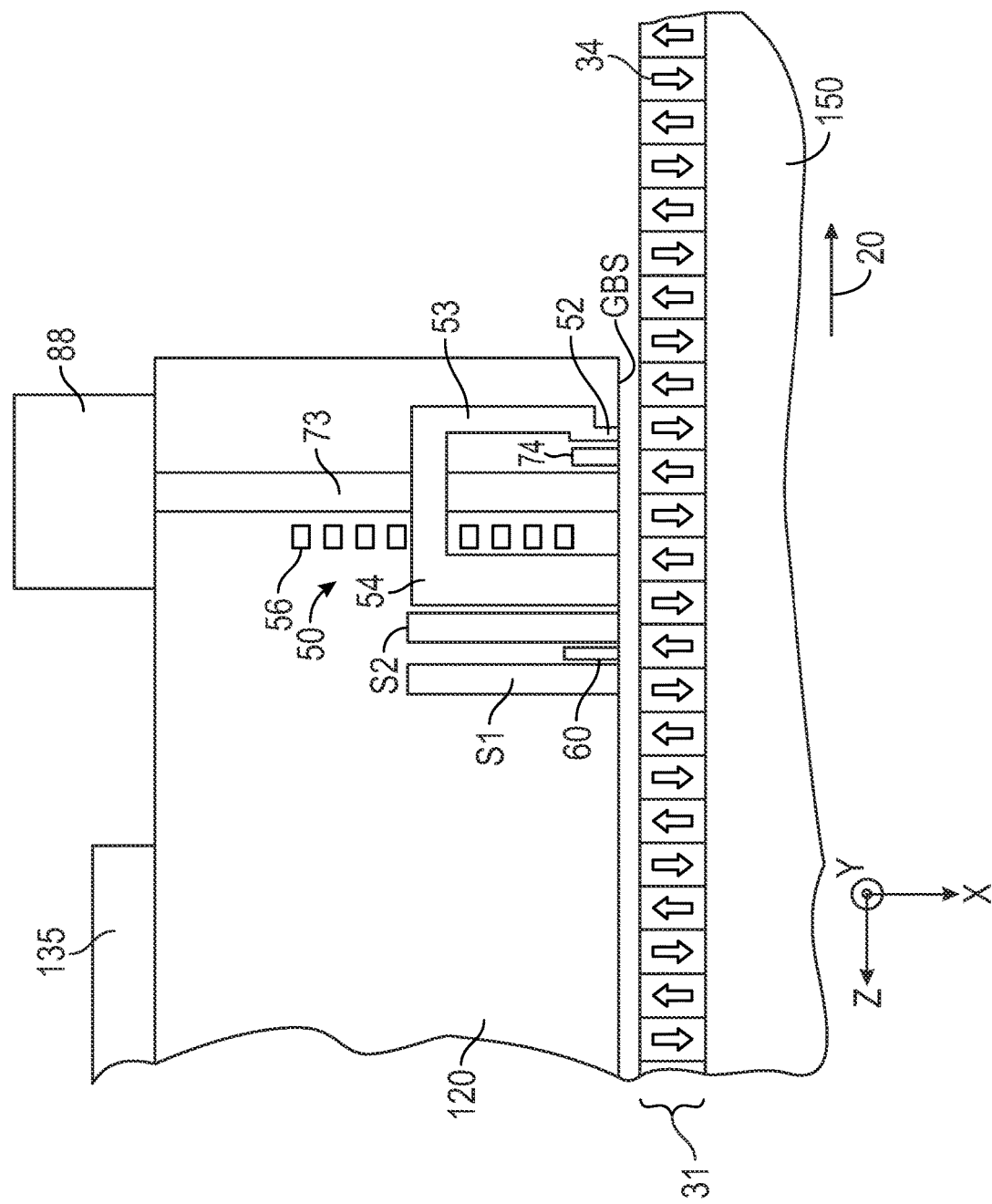
FIG. 2 is a side a sectional view, not drawn to scale because of the difficulty in showing the very small features, of a gas-bearing slider for use in a HAMR disk drive and a portion of a HAMR disk according to the prior art.

In the following drawings, the X-axis denotes an axis perpendicular to the gas-bearing surface (GBS) of the slider, the Y-axis denotes a track width or cross-track axis, and the Z-axis denotes an along-the-track axis. FIG. 2 is a schematic cross-sectional view illustrating a configuration example of a HAMR head according to the prior art. In FIG. 2, the disk 150 is depicted with the recording layer 31 being a conventional continuous magnetic recording layer of magnetizable material with magnetized regions or "bits" 34. The gas-bearing slider 120 is supported by suspension 135 and has a GBS that faces the disk 150 and supports the magnetic write head 50, read head 60, and magnetically permeable read head shields S1 and S2. A recording magnetic field is generated by the write head 50 made up of a coil 56, a primary magnetic pole 53 for transmitting flux generated by the coil 56, a main pole 52 connected to the primary pole 53, and a return magnetic pole 54 coupled to the primary pole 53 and main pole 52. A magnetic field generated by the coil 56 is transmitted through the primary pole 53 to the main pole 52 arranged in a vicinity of an optical near-field transducer (NFT) 74. FIG. 2 illustrates the write head 50 with a well-known "pancake" coil 56, wherein the coil segments lie in substantially the same plane. However, alternatively the coil may be a well-known "helical" coil wherein the coil is wrapped around the primary magnetic pole 53. At the moment of recording, the recording layer 31 of disk 150 is heated by an optical near-field generated by the NFT 74 and, at the same time, a region or "bit" 34 is magnetized and thus written onto the recording layer 31 by applying a recording magnetic field generated by the main pole 52.

A semiconductor laser 88 is mounted to the top surface of slider 120. An optical waveguide 73 for guiding light from laser 88 to the NFT 74 is formed inside the slider 120. Materials that ensure a refractive index of the waveguide 73 core material to be greater than a refractive index of the surrounding cladding material (not shown) may be used for the waveguide 73. For example, $Al_2O_3$ may be used as the cladding material and $TiO_2$, $T_2O_5$ and $SiO_xN_y$ as the core material. Alternatively, $SiO_2$ may be used as the cladding material and $Ta_2O_5$, $TiO_2$, $Nb_2O_5$, $SiO_xN_y$, or Ge-doped $SiO_2$ as the core material. The waveguide 73 that delivers light to NFT 74 is preferably a single-mode waveguide.

Figure 3A:
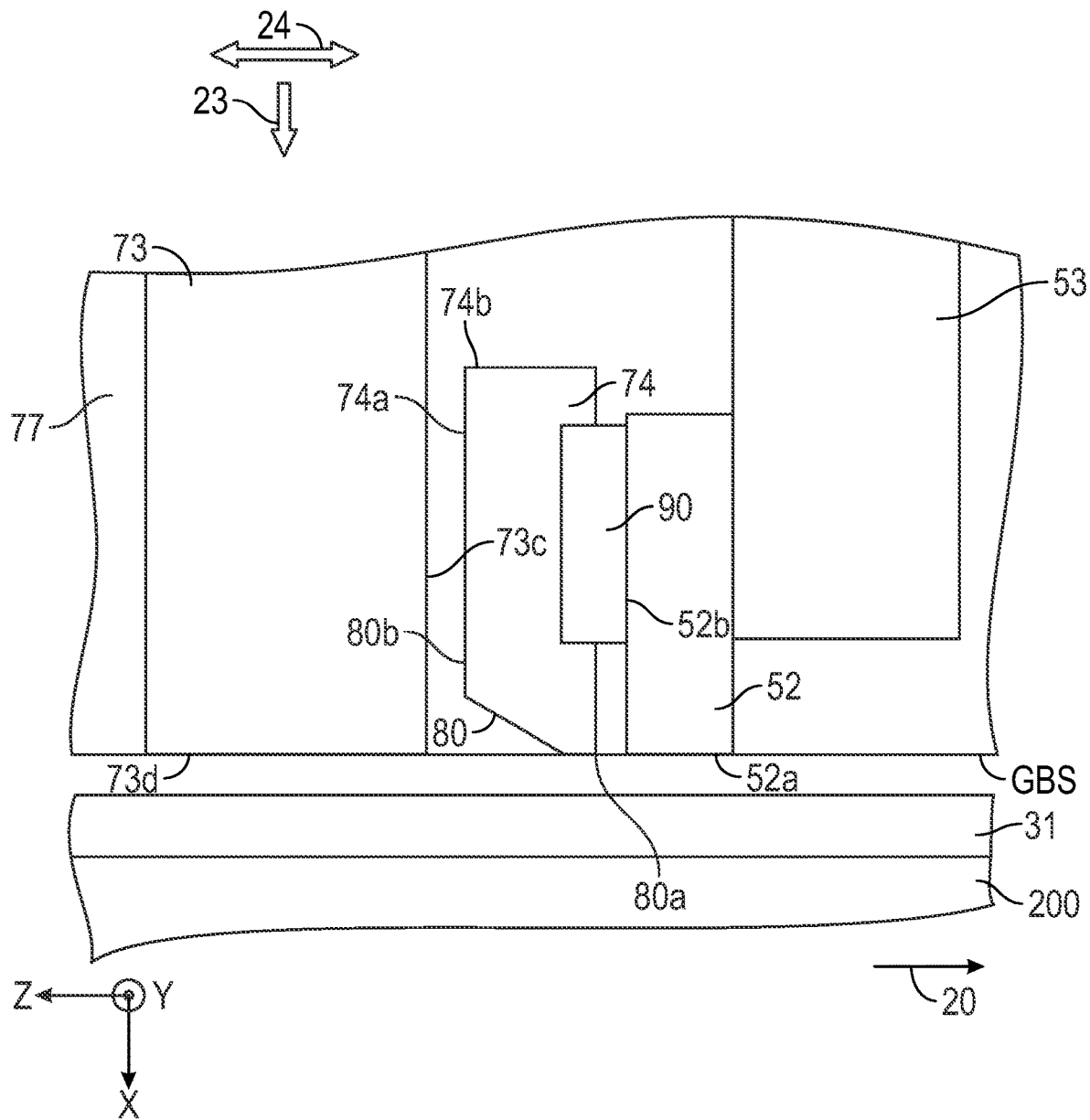
FIG. 3A is a side sectional view of the layers of material making up the main pole and primary pole, the near-field transducer (NFT) and the waveguide according to the prior art and shown in relation to the recording layer on the disk.

FIG. 3A is a side sectional view of a prior art HAMR head and shows the layers of material making up the primary pole 53, main pole 52, NFT 74 and waveguide 73 and shown in relation to disk 150 with recording layer 31. The main pole 52 is typically a layer of high-moment material like FeCo and has a pole tip 52a at the GBS and a surface 52b that faces the NFT 74. The waveguide 73 is a layer of core material generally parallel to the main pole 52 layer with a length orthogonal to the GBS and a waveguide end 73d at the GBS. The waveguide 73 has surrounding cladding material 77 and a generally planar surface 73c that faces and is parallel to NFT 74 layer. The NFT 74 layer is a conductive low-loss metal (preferably Au, but also Ag, Al, Cu, Rh, Ir or their alloys), is generally parallel to waveguide 73 layer and main pole 52 layer and is located between and spaced from the waveguide 73 layer and the main pole 52 layer. The NFT 74 layer has a surface 74a that faces and is spaced from waveguide surface 73c. The NFT 74 layer has an output tip 80 at the GBS. When light is introduced into the waveguide 73, an evanescent wave is generated at the surface 73c and couples to a surface plasmon excited on the surface 74a of NFT 74. Arrow 23 shows the direction of propagation of light in waveguide 73 and arrow 24 shows the direction of polarization of the light. The surface plasmon propagates to the output tip 80. The output tip 80 has an apex 80a that faces the main pole tip 52a and a back edge 80b that faces the waveguide surface 73c. At the apex 80a an optical near-field spot is generated in the space at the GBS between the output tip apex 80a and the main pole tip 52a. The main pole tip 52a applies a magnetic field at the optical spot. A thermal shunt 90 of material with high thermal conductivity like Au, Ag or Cu may be located between NFT 74 and main pole 52 to allow heat to be transferred from the optical spot to heat-sink material located on the cross-track sides of main pole 52. A thermal shunt is described in U.S. Pat. No. 8,619,516 B1, which is assigned to the same assignee as this application.

Figure 3B:
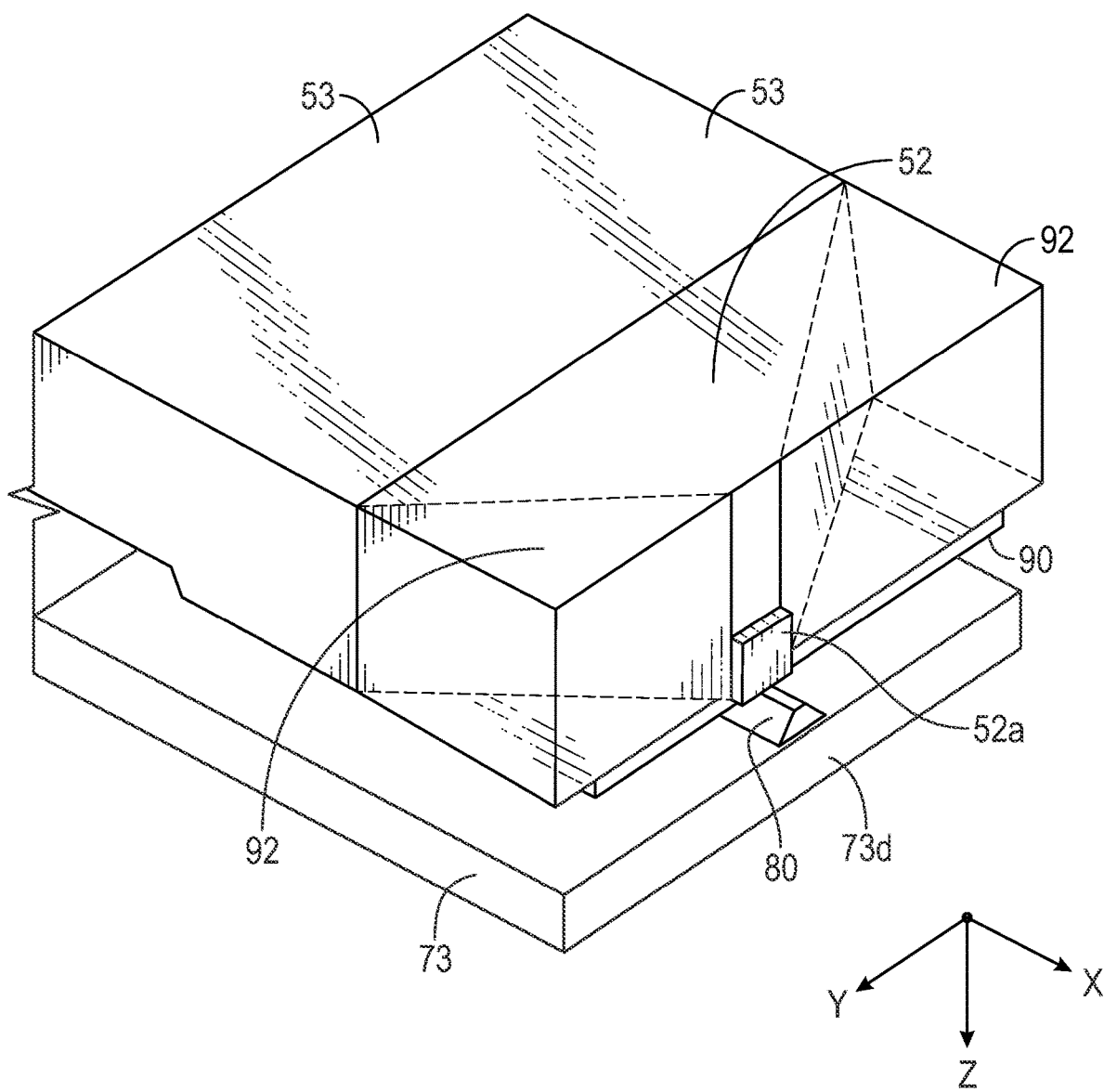
FIG. 3B is a perspective view of the main pole, primary pole, NFT, waveguide and heat-sink material on the cross-track sides of the main pole according to the prior art.

FIG. 3B is a perspective view of a prior art HAMR head and shows heat-sink material 92 in contact with thermal shunt 90, as well as the primary pole 53, the main pole 52, the NFT output tip 80 and the waveguide end 73d. Heat-sink material 92 is located on the cross-track sides of main pole 52 and connected to thermal shunt 90. If the heat-sink material 92 includes an element that may diffuse into the magnetic material of main pole 52, like Au or Cu, then a diffusion barrier layer (not shown) is located between main pole 52 and the heat-sink material 92. The material of the diffusion layer may be, for example, Rh, Ru, In, Co, W, Rh oxide, Ru oxide, Indium oxide, or TiN, with a thickness preferably in the range of 5-10 nm. If the heat-sink material 92 is selected from a material that is not likely to diffuse into the main pole 52, like Ru or Rh, then the diffusion layer is not required.

The HAMR head may include a full-film layer of plasmonic material under the main pole and facing the NFT, which has been proposed to increase the thermal gradient. One definition of a plasmonic material is a metal or metal alloy that has an extinction coefficient k at least twice as great as the index of refraction n at the wavelength of interest. Plasmonic materials provide excellent optical coupling with the NFT, which results in a confined heat source in the recording layer. Au, Ag and Cu are examples of plasmonic materials.

Figure 4A:
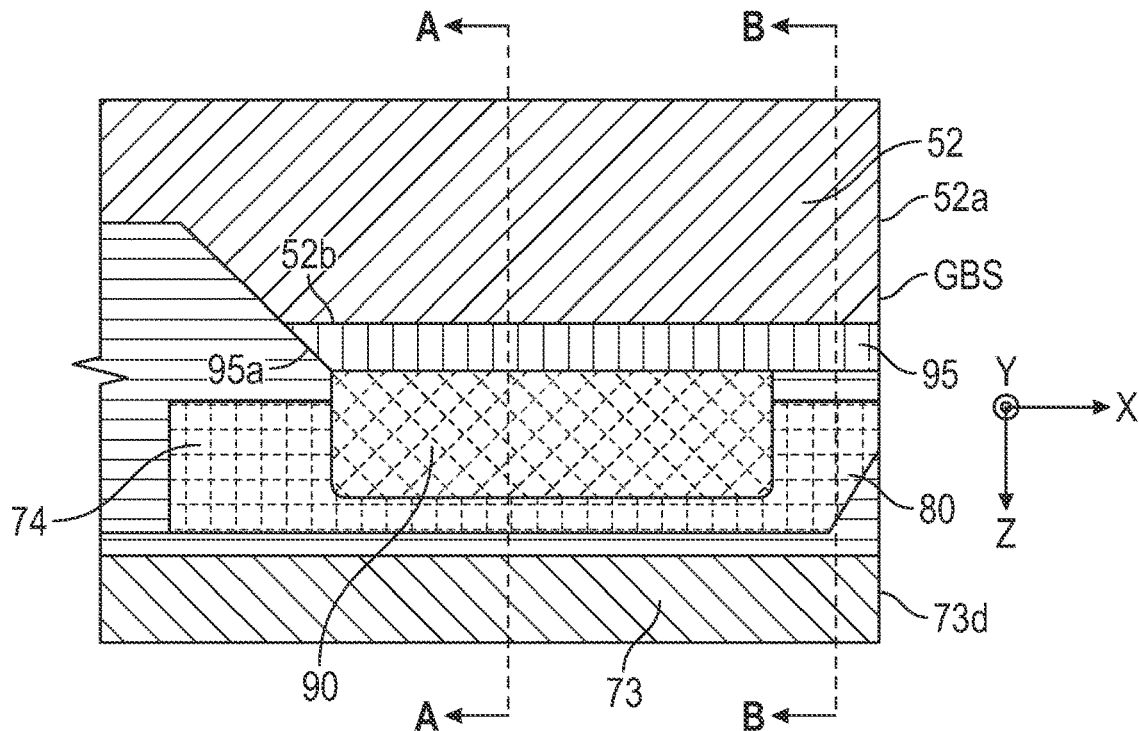
FIG. 4A is a sectional view of a HAMR head according to the prior art and shows the full-film layer of plasmonic material on the NFT-facing surface of the main pole.
Figure 4B:
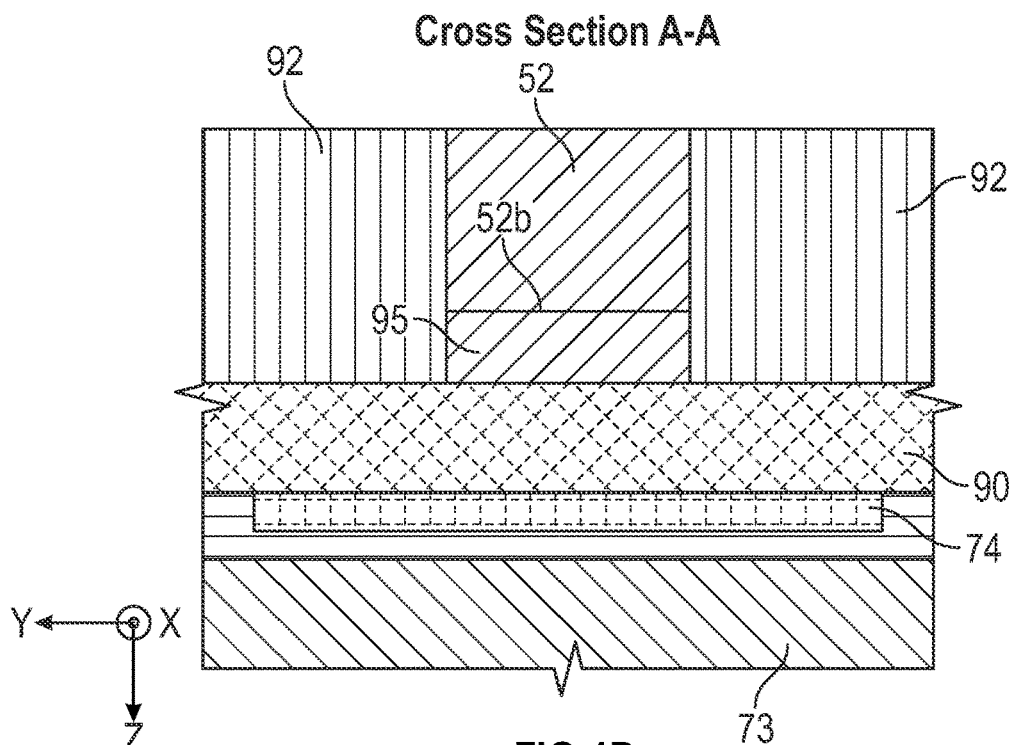
FIGS. 4B and 4C are views of sections A-A and B-B, respectively, of FIG. 4A
Figure 4C:
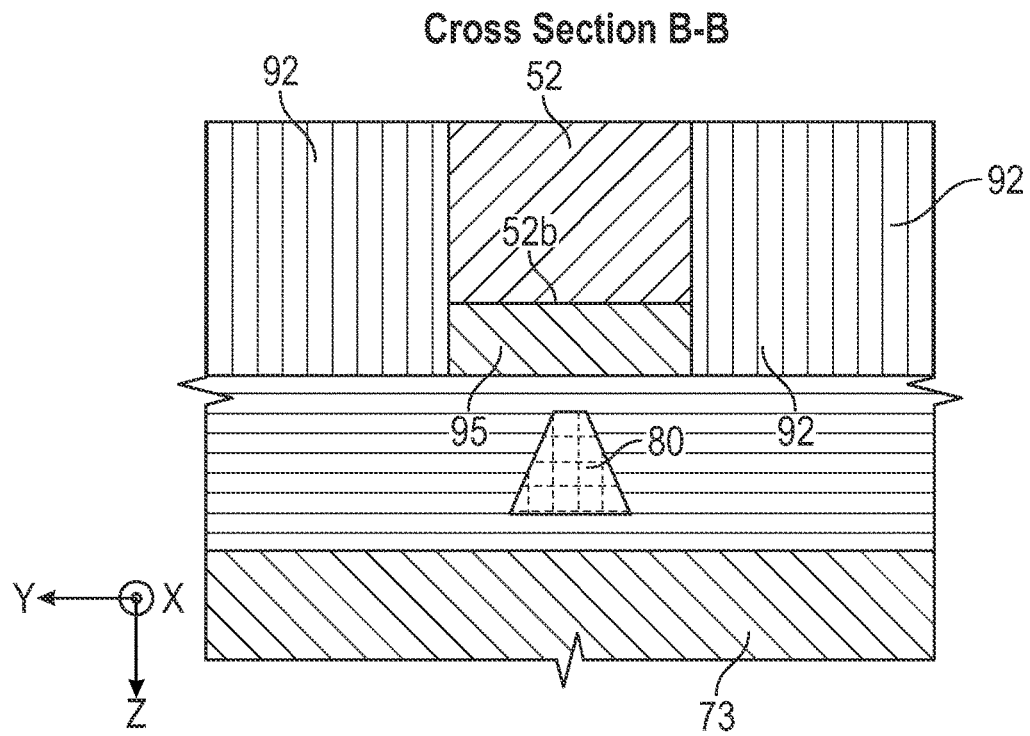

FIG. 4A is a sectional view of a HAMR head and FIGS. 4B and 4C are views of sections A-A and B-B, respectively, for illustrating the full-film layer of plasmonic material. The full-film plasmonic layer 95 is located on the NFT-facing surface 52b of the main pole 52 and extends from the front edge at the GBS to the back edge 95a recessed from the GBS. As shown in FIG. 4A, the plasmonic layer 95 increases the spacing in the along-the track direction (the Z-axis) between the entirety of the main pole 52 and the NFT 74, which reduces the magnetic field intensity at the recording layer.

In embodiments of this invention, the NFT-facing surface of the main pole has a recess or step at the output end of the main pole that contains plasmonic material and is aligned with the NFT output tip in the along-the-track direction. The NFT-facing surface of the main pole that is recessed from the step away from the GBS is in contact with the thermal shunt, and the thermal shunt is in contact with the plasmonic material in the step in the back region recessed from the GBS. As a result, there is no increase in the spacing between the NFT and a large portion of the main pole, with plasmonic material being located only in a step near the GBS.

Figure 5A:
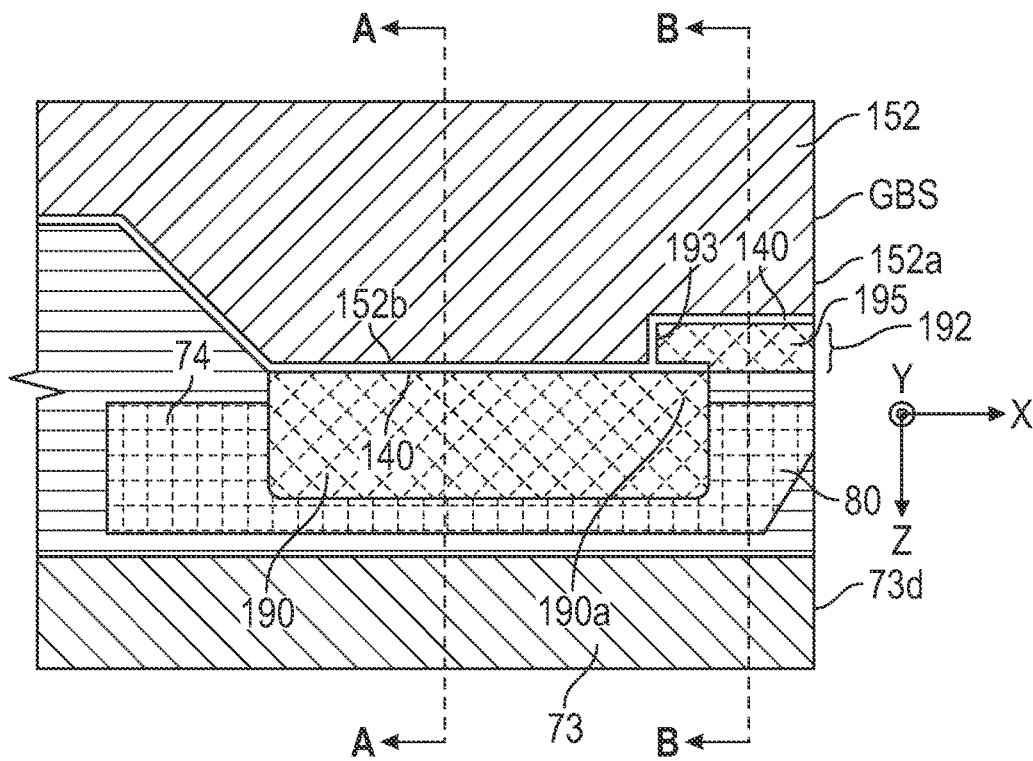
FIG. 5A is a sectional view of a HAMR head according to an embodiment of the invention.
Figure 5B:
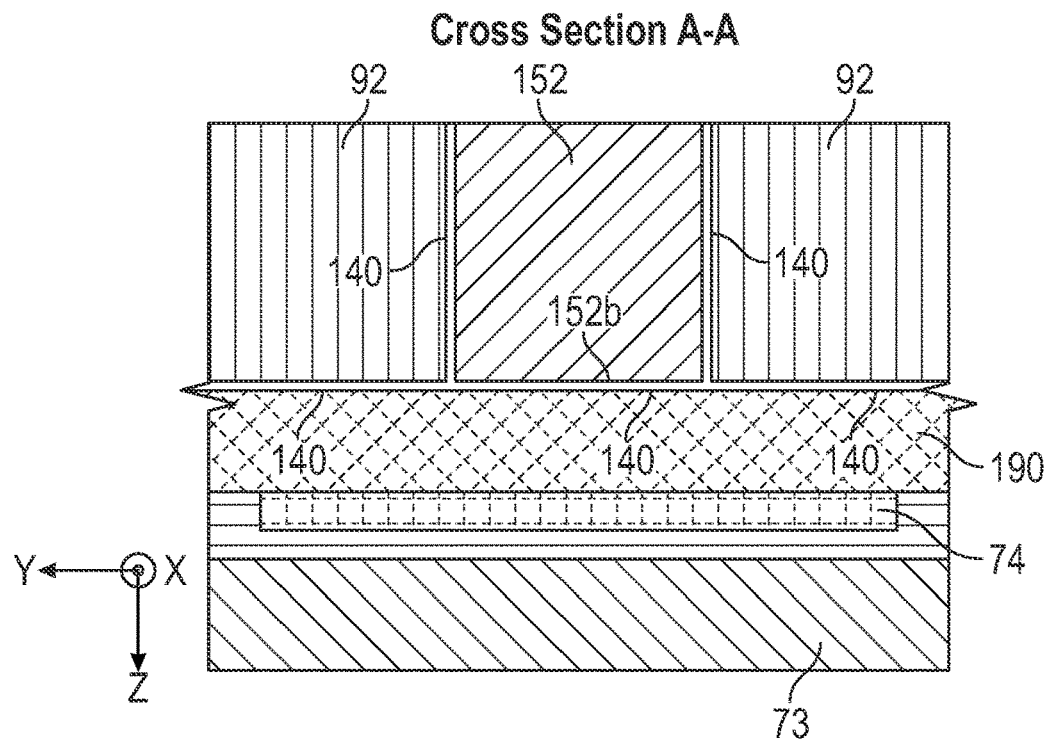
FIGS. 5B and 5C are views of sections A-A and B-B, respectively, of FIG. 5A.
Figure 5C:
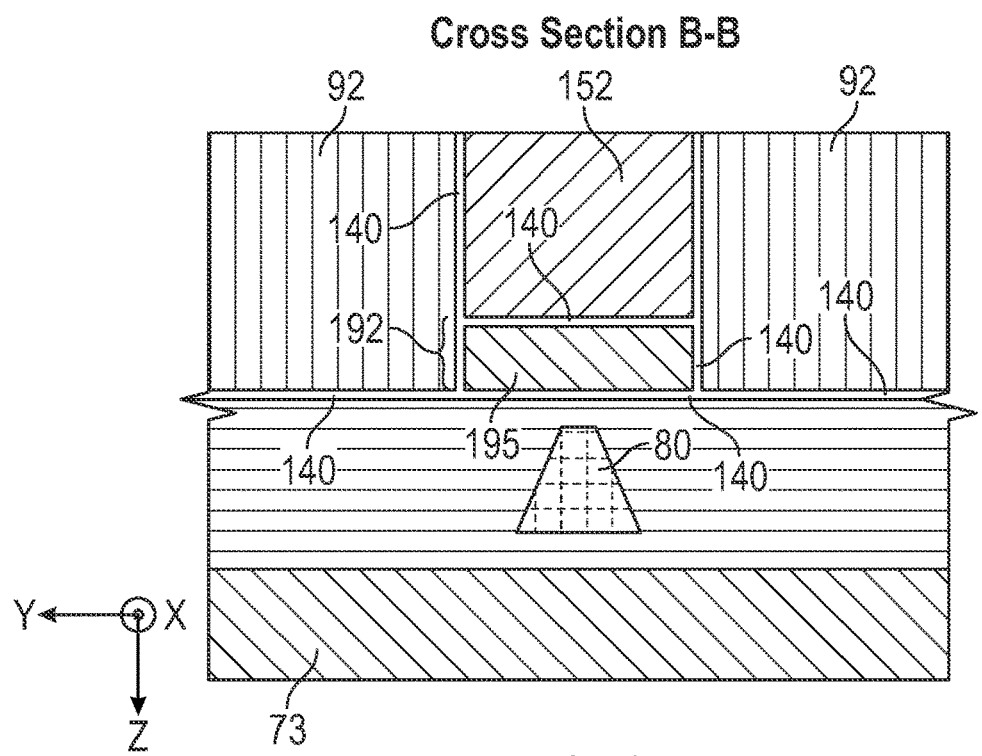

FIG. 5A is a sectional view and FIGS. 5B and 5C are views of sections A-A and B-B, respectively, of a HAMR head according to an embodiment of the invention. The NFT-facing surface 152b of main pole 152 has a recess or step 192 at the output end 152a that extends from the front edge at the GBS to a back edge 193 recessed from the GBS. The step 192 contains plasmonic material that forms a plasmonic recess at the GBS. The NFT-facing surface 152b of the main pole recessed behind back edge 193 away from the GBS remains in contact with the thermal shunt 190. Thus, in this region the spacing between the main pole 152 and the NFT 74 is not reduced but is like the prior art (see NFT-facing surface 52b and NFT 74 in FIG. 3A). A portion 190a of thermal shunt 190 is located at the front of the thermal shunt between the back edge 193 and the GBS. Computer modeling has shown that if a metallic material like that of the thermal shunt is not present in this region but replaced with an extension of the main pole the thermal gradient is decreased.

As shown in FIG. 5A, a thin diffusion barrier 140 between the main pole 152 and the plasmonic material in step 195 is required if the plasmonic material is Au or another material that may diffuse into the material of the main pole 152, which is typically a CoFe or CoFeNi alloy. The diffusion barrier 140 may also be located between the plasmonic material in the step 195 and the thermal shunt 190, as shown in FIG. 5A, for preventing material diffusion between these layers if different materials are used. The diffusion barrier 140 is depicted as being truncated at the front of the thermal shunt, but it may be extended to the GBS. As shown in FIGS. 5B-5C, an optional thin diffusion barrier 140 may be located between the thermal shunt 190 and heat sink material 92 and between the plasmonic material 195 and heat sink material 92. If the heat sink material is the same as the material of the thermal shunt or the plasmonic material then a diffusion barrier is not needed at those interfaces.

Figure 6A:
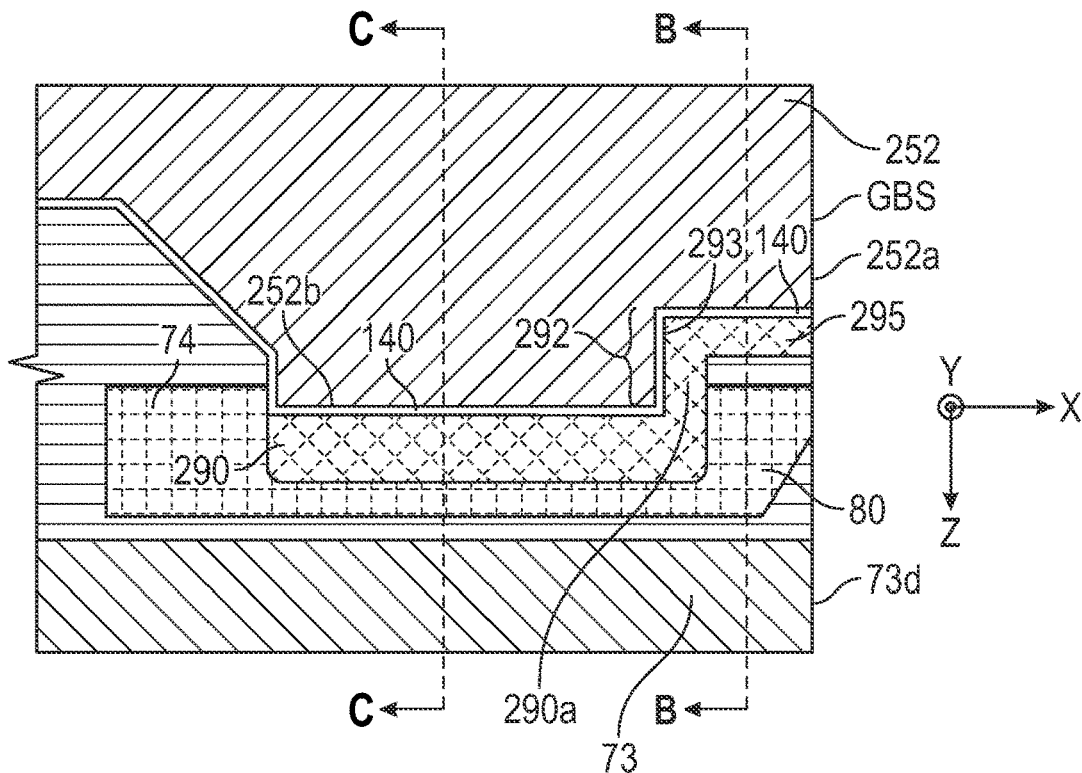
FIG. 6A is a sectional view of a HAMR head according to another embodiment of the invention.
Figure 6B:
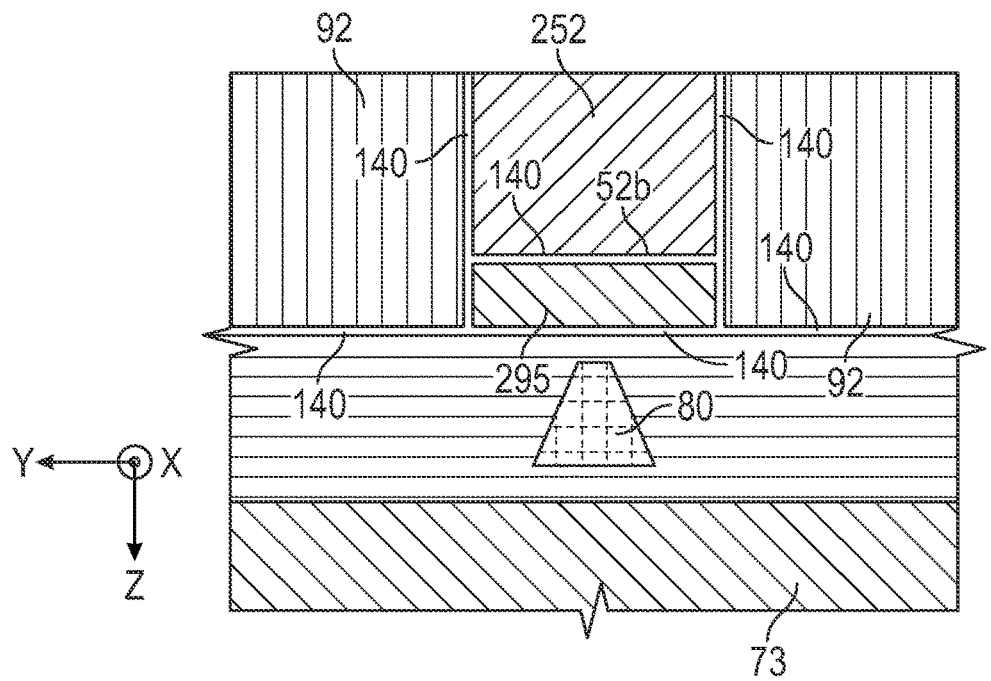
FIGS. 6B and 6C are views of sections B-B and C-C, respectively, of FIG. 6A.
Figure 6C:
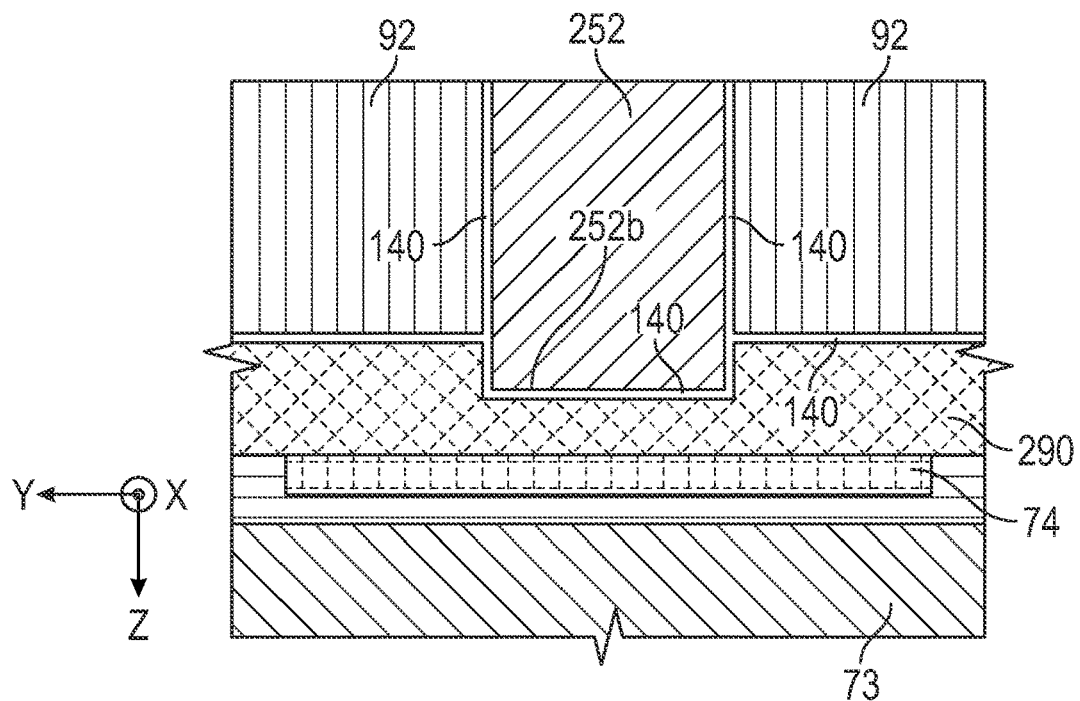

FIG. 6A is a sectional view and FIGS. 6B and 6C are views of sections B-B and C-C, respectively, of a HAMR head according to another embodiment of the invention. In this embodiment the main pole 252 is extended into the thermal shunt 290 in the along-the-track direction (the Z-axis), as shown in the section view of FIG. 6C. The NFT-facing surface 252b of the main pole 252 is thus located within the along-the-track thickness of the NFT 74 so as to be inside the NFT 74 layer. This places the main section of the NFT-facing surface 252b of the main pole 252, the portion recessed from the step 292 away from the GBS, closer to the NFT 74.

In both embodiments the plasmonic recess 195 (FIGS. 5A and 5C) and 295 (FIGS. 6A and 6B) is depicted as being formed of the same material as the materials that may be used for the thermal shunt, for example Au, Ag, Rh, Ir, Cu, Al, Be, Mo, W or their alloys, and is thus continuous with the material of the thermal shunt 190, 290. This is preferred for ease of manufacture, but the plasmonic recess may be formed of a different material than the thermal shunt, and this different material can extend back away from the GBS in the X-direction to form a thin extension layer of material between the NFT-facing surface 152b and 252b and the thermal shunt 190 and 290. However, this thin extension layer of different material still functions as a thermal shunt and thus forms a portion of the thermal shunt in contact with NFT-facing surface 152b and 252b. Materials that may be used for the plasmonic recess include one or more of Au, Rh, Ir, Cu, Ag, Al, Ru, Cr, Pt, Ti, Fe, Co, Ni, Pd, Be, Mo, W and AlN and TiN alloys.

Figure 7:
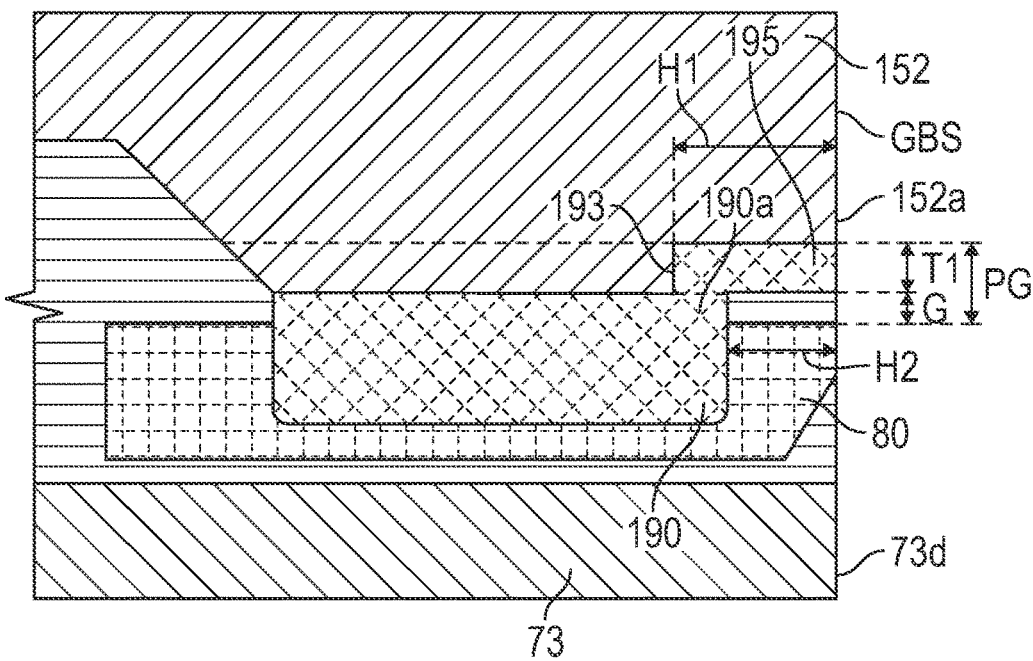
FIG. 7 is a sectional view of an embodiment of the invention for illustrating the relative dimensions of the region at the gas-bearing surface (GBS) of the slider near the plasmonic recess.

FIG. 7 is a sectional view of the region near the GBS of the embodiment of FIGS. 5A-5C for illustrating the relative dimensions. T1 is the along-the-track thickness of the plasmonic recess 195; H1 is the length or height of the plasmonic recess 195 from the GBS to the back edge 193; H2 is the distance from the front edge of the thermal shunt 190 to the GBS; G is the gap in the along-the-track direction between the NFT tip 80 and the plasmonic recess 195; and PG is the gap in the along-the-track direction between the NFT tip 80 and the main pole output end 152a. The preferred range of the dimensions are T1 (5-100 nm), H1 (30-200 nm), H2 (30-100 nm), G (10-30 nm), and PG=G+T1 (15-130 nm).

Computer modeling has shown that for a HAMR head with a full-film plasmonic layer (H1=600 nm) as shown in the prior art of FIGS. 4A-4C with H2=50 nm, G=25 nm, T1=30 nm and PG=55 nm, the magnetic field intensity at the recording point was about 7300 Oe. For the embodiment of FIGS. 5A-5C with the same dimensions except for H1, computer modeling showed that the magnetic field intensity at the recording point was about 8500 Oe, 7800 Oe and 7500 Oe for H1 values of 50 nm, 100 nm, and 200 nm, respectively. Also, for this embodiment for H1 between 50-150 nm, the modeling showed that the thermal gradient was substantially the same as for the full-film prior art HAMR head.

Figure 8A:
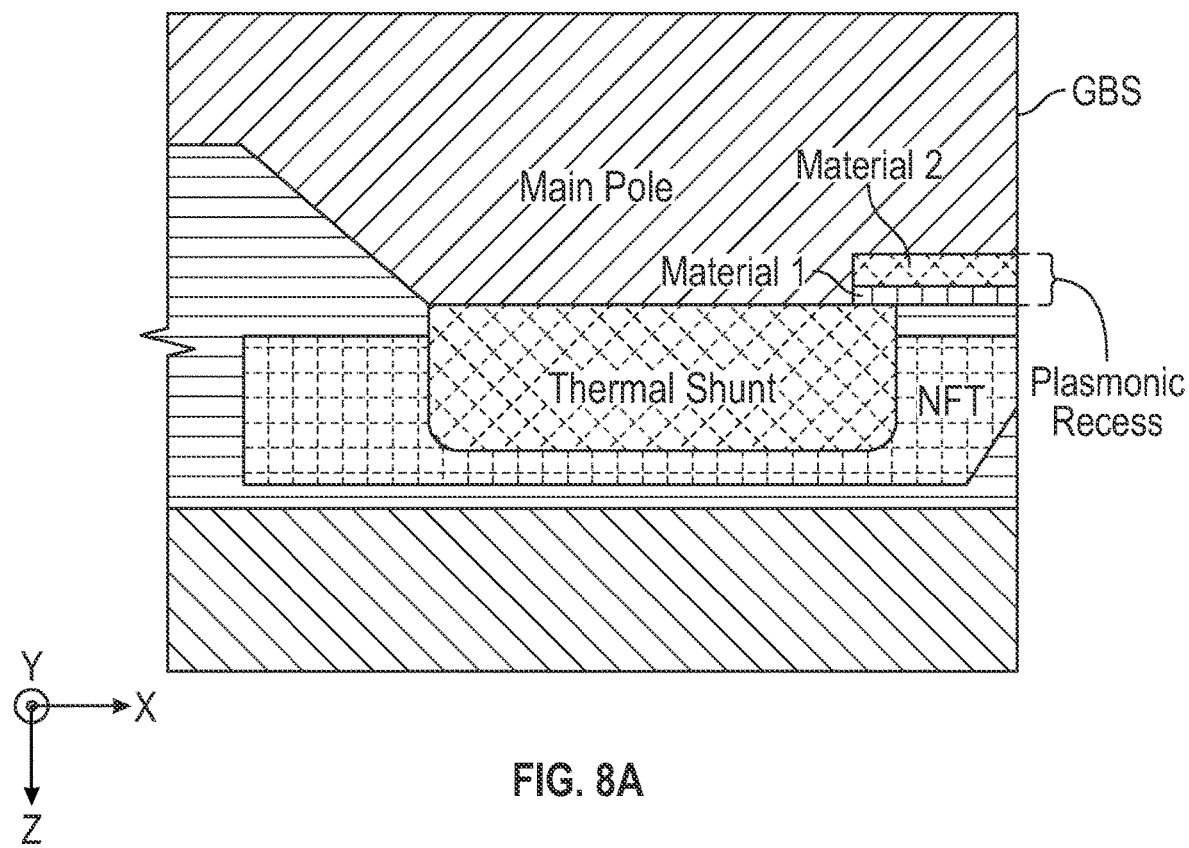
FIGS. 8A-8C are sectional views of embodiments wherein the plasmonic recess is a multilayer of two or more layers.
Figure 8B:
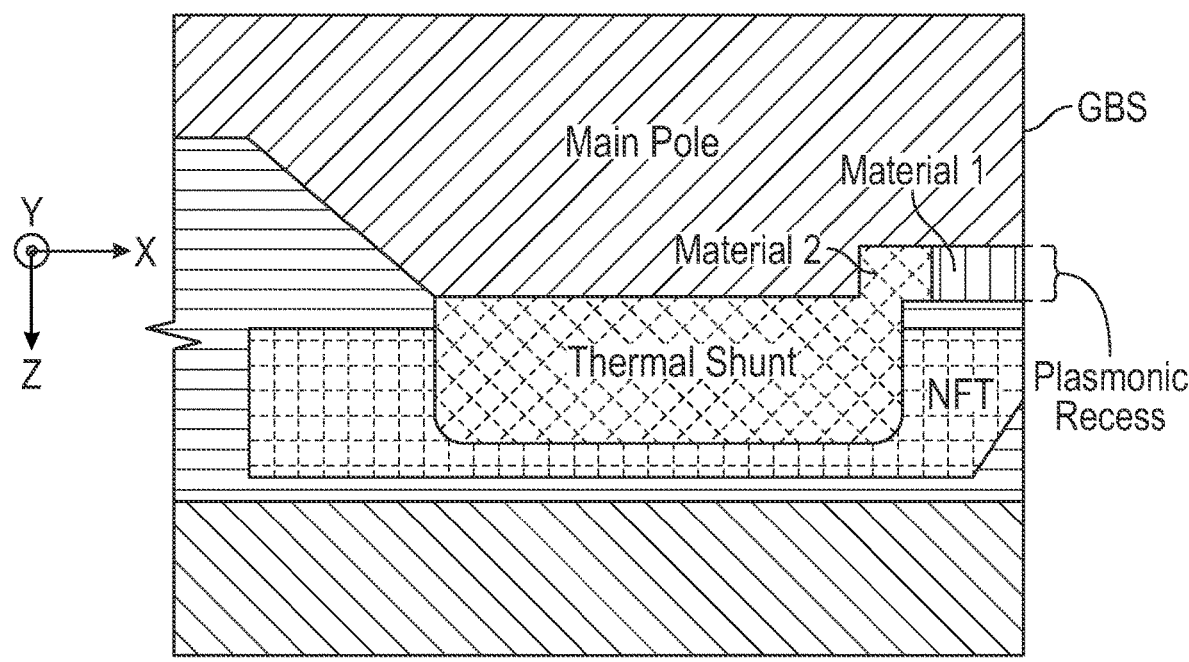
Figure 8C:
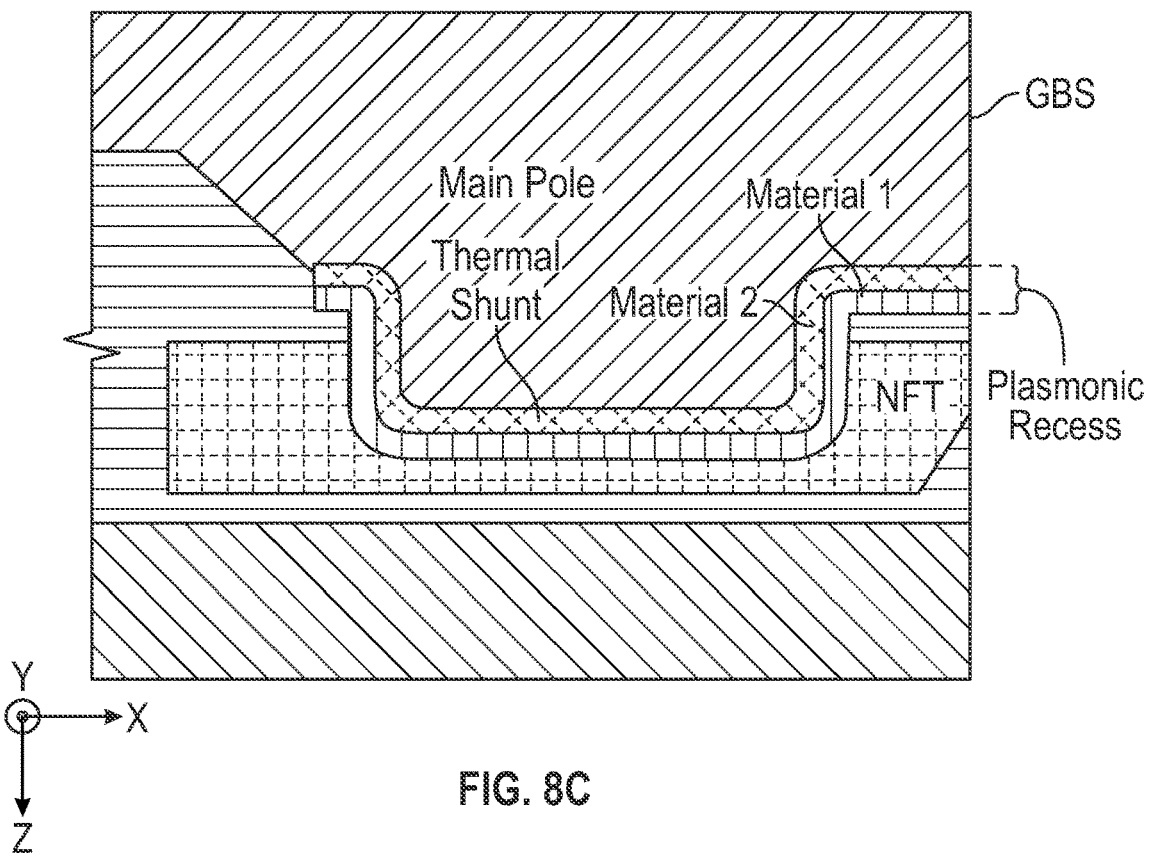

The plasmonic recess may also be a multilayer of two or more layers, as shown in FIGS. 8A-8C. In FIG. 8A materials 1 and 2 are laminated in the along-the-track direction (the Z-axis) and in FIG. 8B materials 1 and 2 are laminated in the direction orthogonal to the GBS direction (the X-axis). For example, it may be desirable to use as material 1 near the NFT a material that is more stable than material 2. For example, if material 2 in FIG. 8A is Au, then material 1 may be Rh, Ir, Cu, Ag, Al, Ru, Cr, Pt, Ti, Fe, Co, Ni, Pd, Be, Mo, W, AlN alloy or TiN alloy. In FIG. 8B, material 2 is the same material as that of the thermal shunt. The multilayers can also be extended into the thermal shunt, as shown in FIG. 8C, if the materials used for the thermal shunt are the same as the materials used for the plasmonic recess.

Figure 9A:
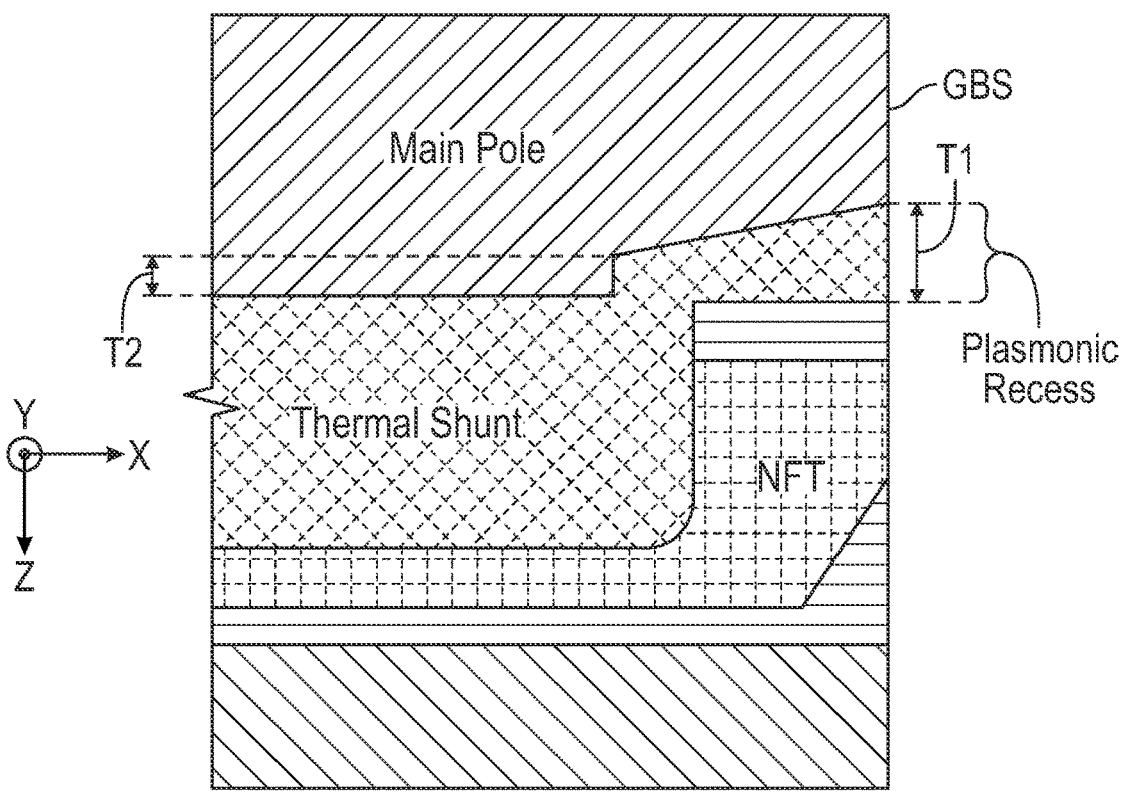
FIGS. 9A-9B are sectional views of embodiments wherein the plasmonic recess is formed with a varying thickness in the along-the-track direction.
Figure 9B:
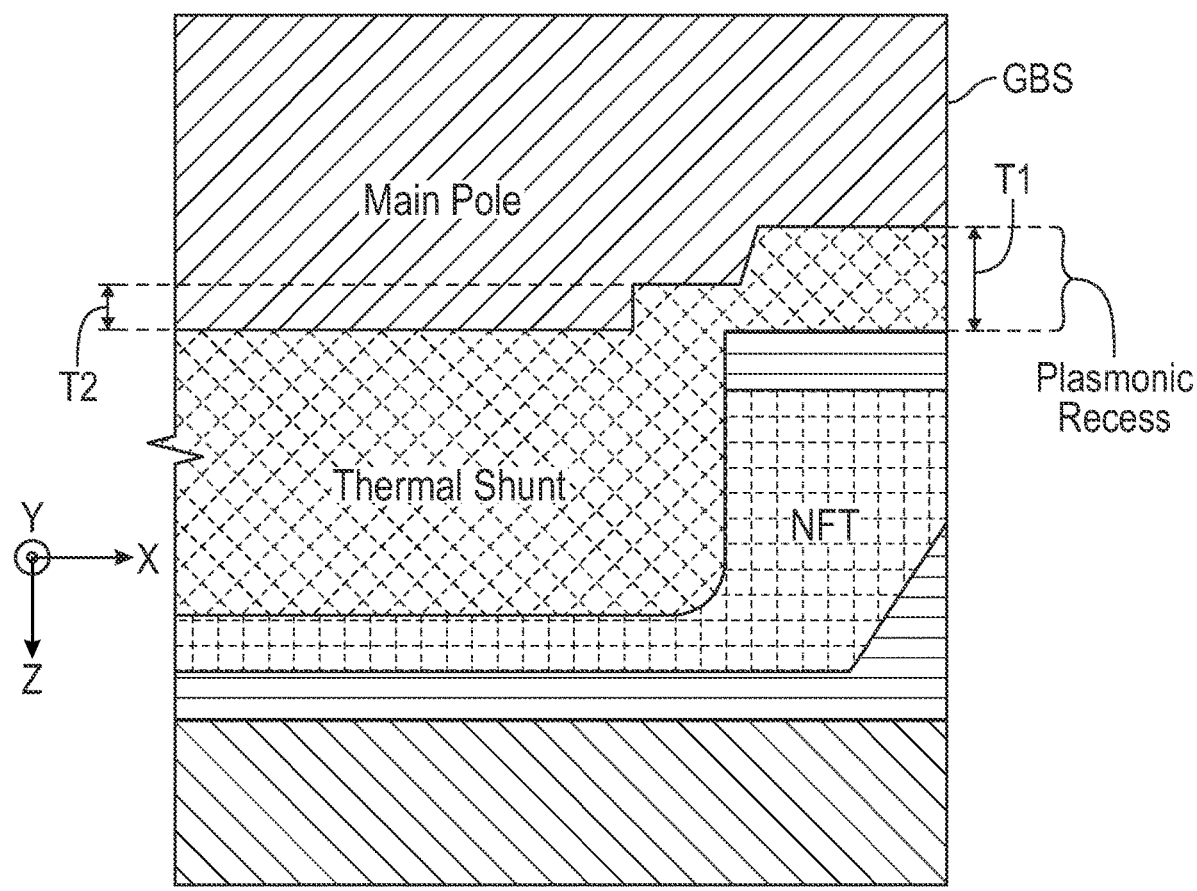

The plasmonic recess may also be formed with a varying thickness in the along-the-track direction (the Z-axis), as shown in FIGS. 9A-9B. In FIG. 9A, the thickness increases gradually and is essentially a linear change from T2 at the back edge to T1 at the GBS, and in FIG. 9B the thickness increases in a step-like manner from T2 to T1. The varying-thickness plasmonic recess can be designed with T1 greater than or less than T2. By varying the thickness at the back edge or the GBS, the magnetic field intensity at the recording point can be adjusted. The varying-thickness plasmonic recess can also be formed of multilayers, like the constant-thickness recesses shown in FIGS. 8A-8C.

While the present invention has been particularly shown and described with reference to the preferred embodiments, it will be understood by those skilled in the art that various changes in form and detail may be made without departing from the spirit and scope of the invention. Accordingly, the disclosed invention is to be considered merely as illustrative and limited in scope only as specified in the appended claims.

What is claimed is:

1. A heat-assisted magnetic recording (HAMR) head for writing to a magnetic recording layer comprising:
   a head carrier having a recording-layer-facing surface, an along-the-track axis and a cross-track axis substantially orthogonal to the along-the-track axis;
   a near-field transducer (NFT) layer on the head carrier on a surface substantially orthogonal to the recording-layer-facing surface and having an output tip substantially at the recording-layer-facing surface;
   a main pole on the head carrier, the main pole having a NFT-facing surface substantially parallel to the NFT layer and an output end at the recording-layer-facing surface, the output end including a step in the NFT-facing surface, the step containing plasmonic material and aligned with the NFT output tip in the along-the-track direction;
   a thermal shunt between the NFT layer and the NFT-facing surface of the main pole, wherein the NFT-facing surface of the main pole recessed from the step in the direction orthogonal to the recording-layer-facing surface is in contact with the thermal shunt, and wherein the thermal shunt is in contact with the plasmonic material in a region recessed from the recording-layer-facing surface; and
   an optical waveguide on the head carrier and optically coupled to the NFT layer.

2. The HAMR head of claim 1 wherein the NFT-facing surface of the main pole recessed from the step in the direction orthogonal to the recording-layer-facing surface extends into the thermal shunt and is located within the NFT layer in the along-the-track direction.

3. The HAMR head of claim 1 wherein the plasmonic material comprises one or more of Au, Rh, Ir, Cu, Ag, Al, Ru, Cr, Pt, Ti, Fe, Co, Ni, Pd, Be, Mo, W, MN alloy and TiN alloy.

4. The HAMR head of claim 1 wherein the plasmonic material comprises a multilayer of two or more dissimilar materials.

5. The HAMR head of claim 4 wherein the multilayer comprises layers laminated in the along-the-track direction.

6. The HAMR head of claim 4 wherein the multilayer comprises layers laminated in a direction orthogonal to the recording-layer-facing surface.

7. The HAMR head of claim 4 wherein the thermal shunt comprises a multilayer continuous with the plasmonic material multilayer.

8. The HAMR head of claim 4 wherein the layer of the multilayer closest to the NFT output tip is selected from Rh, Ir, Cu, Ag, Al, Ru, Cr, Pt, Ti, Fe, Co, Ni, Pd, Be, Mo, W, AlN and TiN.

9. The HAMR head of claim 1 wherein the thickness of the plasmonic material in the along-the-track axis at the recording-layer-facing surface is greater than the thickness at the region recessed from the recording-layer-facing surface.

10. The HAMR head of claim 9 wherein the thickness of the plasmonic material increases linearly from the region recessed from the recording-layer-facing surface to the recording-layer-facing surface.

11. The HAMR head of claim 9 wherein the thickness of the plasmonic material increases in a step-like manner from the region recessed from the recording-layer-facing surface to the recording-layer-facing surface.

12. The HAMR head of claim 9 wherein the plasmonic material comprises a multilayer of two or more dissimilar materials.

13. The HAMR head of claim 1 wherein the thermal shunt is formed of the same material as the plasmonic material in the step.

14. The HAMR head of claim 1 wherein the thermal shunt is formed of a different material than the plasmonic material in the step.

15. The HAMR head of claim 14 wherein the plasmonic material in the step extends back away from the recording-layer-facing surface as an extension layer in contact with the NFT-facing surface of the main pole, said extension layer forming a portion of the thermal shunt.

16. The HAMR head of claim 1 further comprising a diffusion barrier between the NFT-facing surface of the main pole and the plasmonic material in the step.

17. A heat-assisted recording (HAMR) disk drive comprising:
   the HAMR head of claim 1 further comprising a magnetoresistive read head on the head carrier;
   a laser for directing light to the waveguide; and
   a magnetic recording disk having a magnetic recording layer.

18. A heat-assisted magnetic recording (HAMR) head for writing to a magnetic recording layer comprising:
   a gas-bearing slider having a gas-bearing surface (GBS), an along-the-track axis and a cross-track axis substantially orthogonal to the along-the-track axis;
   a near-field transducer (NFT) layer on the slider on a surface substantially orthogonal to the GBS and having an output tip substantially at the GBS;
   a main pole on the slider, the main pole having a NFT-facing surface substantially parallel to the NFT layer and an output end at the GBS, the output end having a plasmonic recess in the NFT-facing surface at the GBS and aligned with the NFT output tip in the along-the-track direction, the plasmonic recess having a front edge at the GBS and a back edge away from the GBS;
   a thermal shunt between the NFT layer and the NFT-facing surface of the main pole, wherein the NFT-facing surface of the main pole recessed from the plasmonic recess in the direction orthogonal to the GBS is in contact with the thermal shunt, and wherein the thermal shunt is in contact with the back portion of the plasmonic recess near the back edge; and an optical waveguide on the slider and optically coupled to the NFT layer.

19. The HAMR head of claim 18 wherein the plasmonic recess is formed of material selected from one or more of Au, Rh, Ir, Cu, Ag, Al, Ru, Cr, Pt, Ti, Fe, Co, Ni, Pd, Be, Mo, W, AlN alloy and TiN alloy.

20. The HAMR head of claim 18 wherein the plasmonic recess comprises a multilayer of two or more dissimilar materials laminated in the along-the-track direction.

21. The HAMR head of claim 20 wherein the thermal shunt comprises a multilayer continuous with the plasmonic recess multilayer.

22. The HAMR head of claim 18 wherein the thickness of the plasmonic recess in the along-the-track axis at the GBS is greater than the thickness at the region recessed from the GBS.

23. The HAMR head of claim 18 further comprising a diffusion barrier between the NFT-facing surface of the main pole and the plasmonic recess.

24. A heat-assisted recording (HAMR) disk drive comprising:

the HAMR head of claim 18 further comprising a magnetoresistive read head on the head carrier;

a laser for directing light to the waveguide; and a magnetic recording disk having a magnetic recording layer.

* * * * *